R. WOLFF.
Button-Hole Cutters.
No. 149,556. Patented April 7, 1874.
Fig: 1.
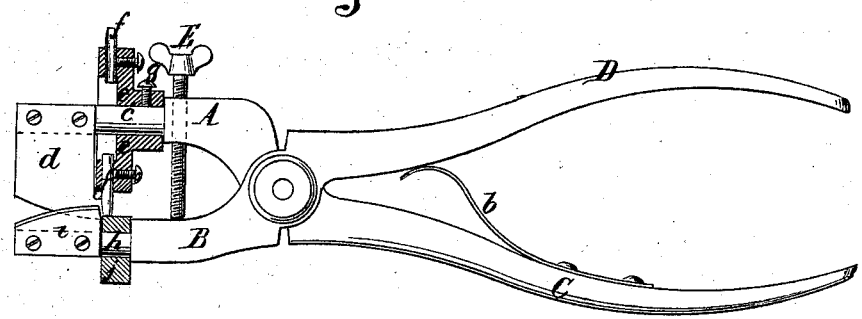
Fig: 2.
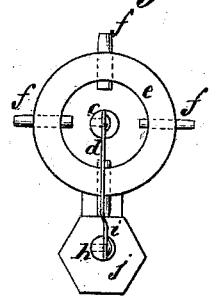
Witnesses:
Inventor:

UNITED STATES PATENT OFFICE.

RAPHAEL WOLFF, OF NEW YORK, N. Y.

IMPROVEMENT IN BUTTON-HOLE CUTTERS.

Specification forming part of Letters Patent No. 149,556, dated April 7, 1874; application filed February 19, 1874.

*To all whom it may concern:*

Be it known that I, RAPHAEL WOLFF, of the city, county, and State of New York, have invented a new and Improved Button-Hole Cutter; and I do hereby declare the following to be a full, clear, and exact description thereof, which will enable those skilled in the art to make and use the same, reference being had to the accompanying drawing, forming part of this specification, in which drawing—

Figure 1 represents a sectional side view of this invention. Fig. 2 is a front view of the same.

Similar letters indicate corresponding parts.

This invention relates to a button-hole cutter with two curved cutting-blades, a rotary punch-head, and a rotary anvil for the punches, said cutting-blades, punch-heads, and anvil being arranged on jaws which open and close by means of handles, and the closing position of which is regulated by a set-screw, in such a manner that the length of the button-hole depends upon the distance to which the curved cutting-blades are permitted to pass each other, while at the same time the appropriate punch strikes the face of the anvil and cuts out the rounded end of the button-hole.

In the drawing, the letters A B designate two jaws, which are connected by a pivot, $a$, and each of which is provided with a handle, C or D, so that by compressing said handles the jaws are closed. A spring, $b$, which acts on the handles, has a tendency to throw the jaws open. From the jaw A projects a pin, $c$, to the outer end of which is firmly secured the cutting-blade $d$, while the inner cylindrical end of said pin forms the bearing for a head, $e$, in the circumference of which are secured a series of punches, $f$. Said head can be turned round on its bearing, and it is adjusted in the required position by a set-screw, $g$. From the jaw B projects a pin, $h$, to the outer end of which is firmly secured the cutting-blade $i$, while its inner end forms the bearing for an anvil, $j$, which is by preference made polygonal, so that by turning the same either of its faces can be brought opposite to one of the punches in the head $e$. The edges of the cutting-blades $d$ $i$ are curved, as shown, so that they begin to cut at their rear end, and that the length of the cut depends upon the distance to which said cutting-edges are permitted to pass each other. By making the cutting-edges curved, they are made to meet in such a manner that the material on which they act is not liable to be pushed outward, and cuts or holes of the desired length can be produced without fail. The length of the hole is adjusted by the punches $f$ and the anvil $j$, said punches being so adjusted in their head that, if one of them is brought opposite to the anvil, it will strike the face of the anvil, and prevent the cutting-blades from passing each other beyond the desired distance as soon as the hole has reached the required length. By the action of the punchers the round ends of the button-holes are produced. In one of the jaws is secured a set-screw, E, which is so adjusted that it prevents the punches from striking too hard against the anvil. The punches $f$ are of different sizes to suit the sizes of the button-holes to be cut, and they are readily adjusted, so that the button-holes are cut to the proper length.

On account of the different diameters of the punches, they have to be placed at such distances from the back edges of the cutters that the holes cut by them will be in the proper position.

When button-holes are to be cut without the eyelet-holes the punches are turned out of the way, and the length of the cuts is determined by the set-screw E. Both the cutting-blades and the punches can be easily removed for sharpening or replacing them by new ones.

What I claim as new, and desire to secure by Letters Patent, is—

The jaws A B, having the blades $d$ $i$ provided with rounded cutting-edges, in combination with the rotating head $e$ having punches $f$, and with the rotating anvil $j$, substantially as herein shown and described.

RAPHAEL WOLFF.

Witnesses:
W. HAUFF,
E. F. KASTENHUBER.